(12) United States Patent
Lee

(10) Patent No.: US 12,443,328 B2
(45) Date of Patent: Oct. 14, 2025

(54) METHOD TO EFFECTIVELY PRESENT A LARGE AMOUNT OF LOCATION-BASED CONTENT THROUGH A HYBRID USER INTERFACE OF A MAP AND A SCROLL FEED IN A LOCATION-BASED SOCIAL NETWORK

(71) Applicant: Project Dots Inc., Sunnyvale, CA (US)

(72) Inventor: Hark Bum Lee, Sunnyvale, CA (US)

(73) Assignee: Project Dots Inc., Sunnyvale, CA (US)

( * ) Notice: Subject to any disclaimer, the term of this patent is extended or adjusted under 35 U.S.C. 154(b) by 61 days.

(21) Appl. No.: 17/981,343

(22) Filed: Nov. 4, 2022

(65) Prior Publication Data

US 2024/0152247 A1   May 9, 2024

(51) Int. Cl.
| | |
|---|---|
| *G06F 3/04817* | (2022.01) |
| *G06F 16/29* | (2019.01) |
| *G06Q 50/00* | (2024.01) |

(52) U.S. Cl.
CPC .......... *G06F 3/04817* (2013.01); *G06F 16/29* (2019.01); *G06Q 50/01* (2013.01); *G06F 2203/04806* (2013.01)

(58) Field of Classification Search
CPC .............. G06F 3/048; G06F 3/04817; G06F 2203/04806; G06F 16/29; G06Q 50/01; H04W 4/02–029; H04W 4/21
See application file for complete search history.

(56) References Cited

U.S. PATENT DOCUMENTS

| | | | |
|---|---|---|---|
| 8,671,106 B1* | 3/2014 | Lee | G06F 16/951 707/767 |
| 9,464,909 B2* | 10/2016 | Chen | G01C 21/3605 |
| 2009/0169060 A1* | 7/2009 | Faenger | G09B 29/007 382/113 |
| 2010/0211909 A1* | 8/2010 | Ghanekar | G06F 16/29 715/788 |
| 2014/0218394 A1* | 8/2014 | Hochmuth | G06F 18/23 345/629 |
| 2014/0359510 A1* | 12/2014 | Graf | G01C 21/3667 715/771 |
| 2016/0179823 A1* | 6/2016 | Yang | G06F 3/04812 715/764 |
| 2020/0012389 A1* | 1/2020 | Mikhaylov | G01C 21/3664 |
| 2020/0120097 A1* | 4/2020 | Amitay | H04L 67/52 |
| 2021/0357083 A1* | 11/2021 | Aspinall | G06F 3/0485 |

FOREIGN PATENT DOCUMENTS

| | | |
|---|---|---|
| JP | 6184840 B2 | 8/2017 |
| KR | 10-2012-0137572 A | 12/2012 |

* cited by examiner

*Primary Examiner* — Liang Y Li
(74) *Attorney, Agent, or Firm* — Invenstone patent LLC

(57) ABSTRACT

In an embodiment, a method to effectively present a large amount of location-based content through a hybrid user interface of a map and a scroll feed in a location-based social network is generally described. The method can include acquiring location-based content; and presenting the location-based content using the hybrid user interface. A location-based content object is rendered on the map as a marker that displays an image or a video in a predetermined shape, the size of which reflects the relative importance of the corresponding location-based content object.

17 Claims, 8 Drawing Sheets

FIG. 7
a) 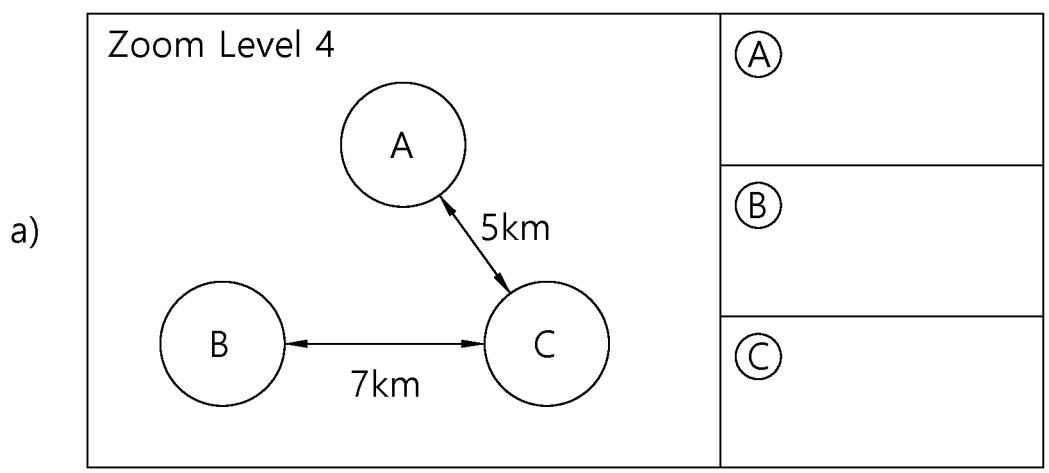
b) 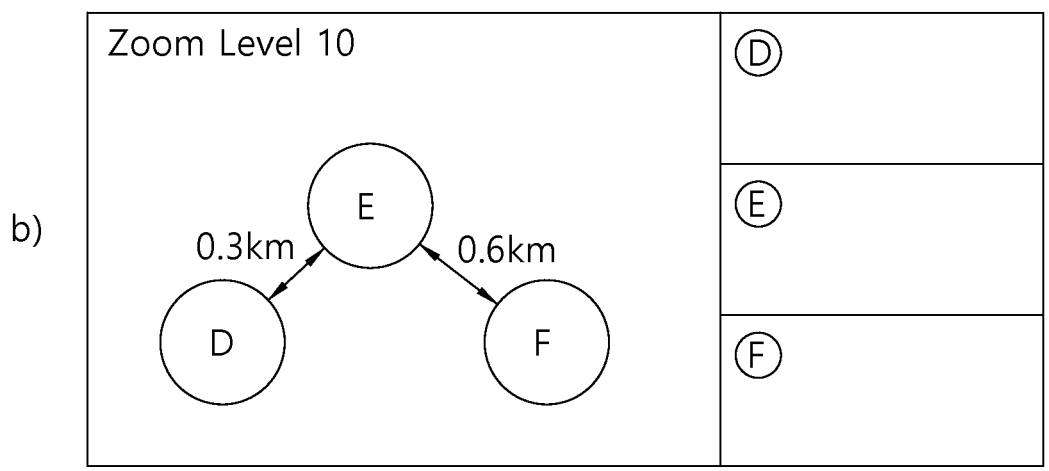

METHOD TO EFFECTIVELY PRESENT A LARGE AMOUNT OF LOCATION-BASED CONTENT THROUGH A HYBRID USER INTERFACE OF A MAP AND A SCROLL FEED IN A LOCATION-BASED SOCIAL NETWORK

BACKGROUND OF THE DISCLOSURE

Field of the Disclosure

The present disclosure relates to a hybrid user interface and, more particularly, to a method to effectively present a large amount of location-based content through the hybrid user interface of a map and a scroll feed in a location-based social network.

Related Art

Along with the recent growth in the use of smart phones, the number of social networking services has also been increasing, and users are requesting various forms of social platforms and different ways to consume social media content. In this light, there have been many attempts to integrate a map into the social feed. In some examples, when a user points to a specific area on a map, the corresponding local content is displayed.

In many social networking services employing a map, social activities of users in a specific area are displayed with markers. However, when a large number of markers are present on the map, the markers are often displayed in an overlapped manner, and therefore, a user is unable to distinguish them from each other.

In a typical map, only a finite number of objects are rendered at any given scope and a user must constantly interact with the map to see more or less content. In almost all map services, all location-based objects are created and maintained by the platform and users can only contribute as reviewers to the existing place objects.

SUMMARY OF THE DISCLOSURE

The present disclosure provides a method to effectively present a large amount of location-based content through a hybrid user interface of a map and a scroll feed in a location-based social network.

In an embodiment, a method to effectively present a large amount of location-based content through a hybrid user interface of a map and a scroll feed in a location-based social network is generally described. The method can include acquiring location-based content and presenting it through the hybrid user interface. A location-based content object is rendered on the map as a marker that displays an image or a video in a predetermined shape, the size of which reflects the relative importance of the corresponding content object.

The hybrid user interface takes a stratified approach to determine how the location-based content is presented. Location-based content data is divided into the representative set that consists of what are called cover dots and the common set that consists of what are called regular dots.

In order to determine the representative set, the map is divided into a grid of unit cells, and a representative content object is elected for each unit cell through local competition among all dots within the unit cell. The election of the cover dots is carried out under competition criteria consisting of at least one of the following factors—popularity, recency, usefulness of the content, depending on the type of the user request.

In another embodiment, the cover dots are selected through an editorial process where the local representatives are manually approved by an editor or an editorial group.

The cover dots are rendered as fixed markers on the map, and the cover dots remain unchanged unless the scope of the map is altered by the user and a survey of the new area is requested.

The common set, also referred to as regular dots, is presented as a temporary marker on the map which becomes visible only when the associated content is focused on the scroll feed.

The zoom level of the map in the hybrid user interface dynamically changes in response to user action at the scroll feed. The zoom level is determined to appropriately place the markers associated with the previous, the current (focused), and next content objects in the scroll feed and minimize overlapping between markers.

In another embodiment, an apparatus to provide a hybrid user interface of a map and a scroll feed in a location-based social network to effectively present a large amount of location-based content is generally described. The apparatus can include a communication unit configured to acquire location-based content from a plurality of user terminals and a processor configured to present location-based content using the hybrid user interface. A location-based content object is rendered on the map as a marker that displays an image or a video in a predetermined shape, the size of which reflects the relative importance of the corresponding object.

Using the user interface, a user can browse through a large amount of location-based content and save that of one's liking in the bucket list, which creates a subset of the content and therefore a customized map for the user.

Unlike a traditional map where only a finite number of place objects are rendered at any given scope and a user must constantly interact with the map to see more or less content, an embodiment of the user interface described in the present disclosure enables presentation and control of a large amount of location-based content through a simple scroll action.

Unlike a traditional map where all location-based place objects are created and maintained by the platform and users can only contribute as reviewers to the existing places, an embodiment of the user interface described in the present disclosure creates a map where each object may be owned by a different user and tells a unique story. This enables a higher level of creative freedom for users.

BRIEF DESCRIPTION OF THE DRAWINGS

FIG. 7 is a diagram describing a process of dynamically changing the zoom level of the map to appropriately place markers associated with the previous, the current (focused), and the next social posts in the scroll feed on the map and minimize overlapping of the markers.

DESCRIPTION OF EXEMPLARY EMBODIMENTS

Figure 1:
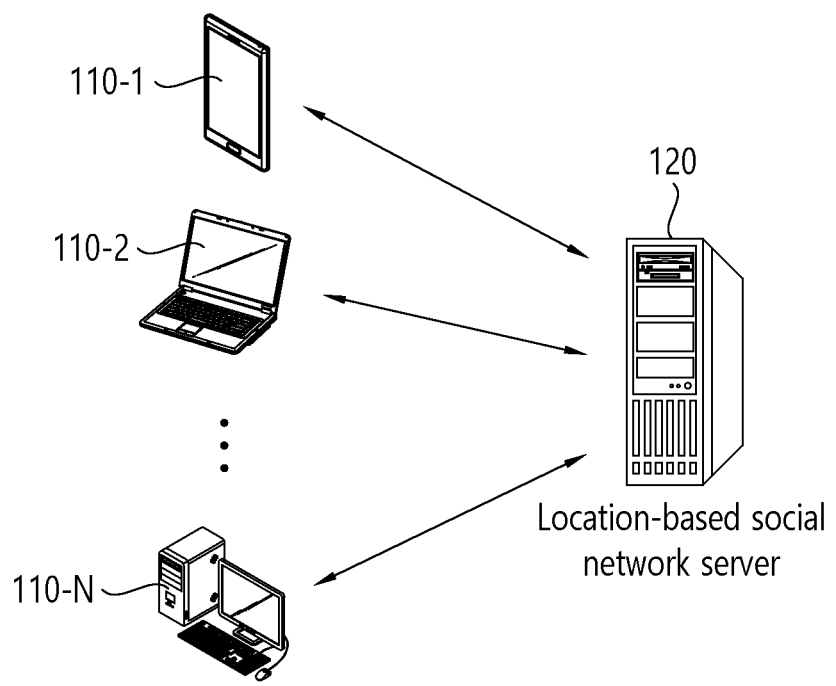
FIG. 1 is a schematic diagram illustrating a system in which a method to effectively present a large amount of location-based content according to an embodiment of the present disclosure is used.

The present invention may have various modifications and various embodiments and specific embodiments will be illustrated in the drawings and described in detail in the detailed description.

However, this does not limit the present invention to specific embodiments, and it is understood that the present invention covers all the modifications, equivalents and replacements included within the idea and technical scope of the present invention.

Terms including first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present invention. A term "and/or" includes a combination of a plurality of associated disclosed items or any item of the plurality of associated disclosed items.

When it is described that a component is "connected to" or "accesses" another component, the component may be directly connected to or access the other component, or a third component may be present therebetween. In contrast, it is understood that, when it is described that an element is "directly connected to" or "directly access" another element, it is understood that no element is present between the element and another element.

Terms used in the present application are used only to describe specific embodiments and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present but does not exclude a possibility of the presence or addition of one or more other features, numbers, steps, operations, components, parts or combinations thereof, in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art and are not interpreted as ideal meanings or excessively formal meanings unless clearly defined in the present application.

Hereinafter, preferred embodiments of the present invention will be described in detail with reference to the accompanying drawings and in describing the preferred embodiments with reference to the accompanying drawings, the same reference numeral will refer to the same or corresponding component regardless of the reference numeral and a duplicated description thereof will be omitted.

In this specification, the term "dot" means a location-based content object. And a dot may be rendered on the map as a marker that displays an image or a video in a circular shape, the size of which reflects the relative importance of the object. However, the shape of the marker is not limited in the circular shape. It could be a triangle or a square and so on.

Also, the location-based content data is divided into the representative set and the common set. The representative set may be referred to as cover dots and the common set may be referred to as regular dots.

In order to determine the representative set, the map is divided into a grid of unit cells, and a representative content object (a cover dot) is elected for each unit cell through local competition among all included dots.

The election of cover dots is carried out under various competition criteria (popularity, recency, or usefulness of the content) in response to corresponding user requests.

The cover dots can also be selected through an editorial process where the local representatives are manually approved by an editor or an editorial group.

The cover dots are rendered as fixed markers on the map, and they will remain unchanged unless the scope of the map is altered by the user and a survey of the new area is requested.

The common set (the rest of the content) is presented as a temporary marker which becomes visible only when the associated content post is focused (centered) on the scroll feed.

FIG. 1 is a schematic diagram illustrating a system in which a method to effectively present a large amount of location-based content according to an embodiment of the present disclosure is used. The system based on method according to an embodiment of the present disclosure may include a plurality of client terminals 110-1 to 110-N and a location-based social network server 120.

In FIG. 1, the client terminals 110-1 to 110-N may be terminals of users provided with a location-based social network. These may include a smart phone, a personal digital assistant (PDA), a laptop, a netbook, a personal computer, a wireless sensor, a user electronic equipment (CE), but are not limited thereto.

The client terminals 110-1 to 110-N may be connected to the location-based social network server 120 through a wired and/or wireless network. And then, the client terminals 110-1 to 110-N may receive map data provided by the server 120. In addition, the client terminals 110-1 to 110-N may upload their content, associated with a specific point on the map provided by the server 120.

The client terminals 110-1 to 110-N may include an upload terminal 110-1 that uploads location-based content to the server 120 and a download terminal 110-2 that receives the uploaded content from the server 120.

On the download side, the client terminal 110-2 may mark their favorite content and the client terminal 110-2 N may perform a user-specific management such as storing their favorite content using the function such as a "bucket" and loading it later. Using the user interface provided from the server 120, a user can browse through a large amount of location-based content and save that of one's liking in the bucket list, which creates a subset of content and therefore a customized map for the user.

On the upload side, the client terminal 110-1 may manage their own uploaded content and the related map data independently as same as the download side. The content uploaded by the client terminal 110-1 and the related map data may be individually owned by the uploaded user.

The location-based social network server 120 may include a server that is capable of a wired or wireless network communication. The server 120 may also be called a map data providing apparatus, a map service server, a social network service server, a hybrid user interface providing apparatus, or so on. The server 120 provides a geographical map service to users of the client terminals 110-1 to 110-N, which subscribe to the location-based social network. The server 120 may combine map data based on GIS with a social feed. The server 120 may provide a map service by using special types of data forwarding schemes.

Particularly, the server 120 may display map data by distinguishing a finite number of content objects that represent the current map area, and they are called the cover dots. The cover dots are selected from the entire set of content objects located within the scope of the map through local competition. The rest of the content objects excluding the cover dots are called regular dots. In this case, the cover dots may be displayed in the form of fixed markers when the map data for the specific area is displayed, but the regular dots may be displayed in the form of temporarily appearing and disappearing markers along with the scroll progression of the social feed.

In a method of displaying a marker on a map, the server 120 renders location-based content such as images or videos in a predetermined shape like circular shape. However, the map marker is not limited thereto, and may be displayed by various shapes and various visual expressions. For example, depending on the characteristics of the object, a shape of a simple icon from which content are excluded, a shape combined with a text, or a shape including an image or a video may be used. In this case, the size of the map marker reflects the relative importance of the object.

Meanwhile, the server 120 may display a social scroll feed together with map data in one display screen. In this case, the social feed may display location-based content in the form of a social post including images, videos, text and any combination of these elements. The server 120 sends information on the markers associated with the social posts in response to the vertical scrolling of the social feed in the client terminals 110-1 to 110-N. Through this, even in the case that many markers are present in the current map area, the user may go through all location-based content objects and their relevant locations on the map without missing a single item through simple scrolling.

According to an embodiment of the present disclosure, the location-based social network from the server 120 allows anyone to create one's own dot anywhere on the map. The user A of the client terminal 110-1 may upload multiple dots on a specific area. Sometimes, more dots may be created by user B and user C in the same map area. In the case that there is a plurality of dots privately owned by different users in a specific scope of the map, the server 120 carries out the election of cover dots under various competition criteria (popularity, recency, or usefulness of the content) in response to corresponding user requests. The cover dots may be always displayed on the map as described above until the view settings are changed by the user. This is different from a conventional map service where all content objects are unilaterally created and managed by the platform provider.

Furthermore, the dots not selected as the cover dots (regular dots) are not discarded and will be sequentially rendered on the map through the scroll of the social feed. Using the abundant information provided by the regular dots, a user may gain a deeper understanding of the history, what is new, what is popular or what is useful in a specific area of the map. Also, a user may create his or her own map through the feature such as the "bucket" (e.g., bookmark/save function). Using the user interface, a user can browse through a large amount of location-based content and save that of one's liking in the bucket list, which creates a subset of content and therefore a customized map for the user.

Meanwhile, the server 120 may store detailed personal information such as a personal educational background, a preference, an interest and a hobby together with basic information such as an ID, a name, an age, and a gender of a user. Through this, when a user accesses the location-based social network and requests content data, the server 120 may take these user-specific factors into account in generating social feeds and select more relevant information.

Figure 2:
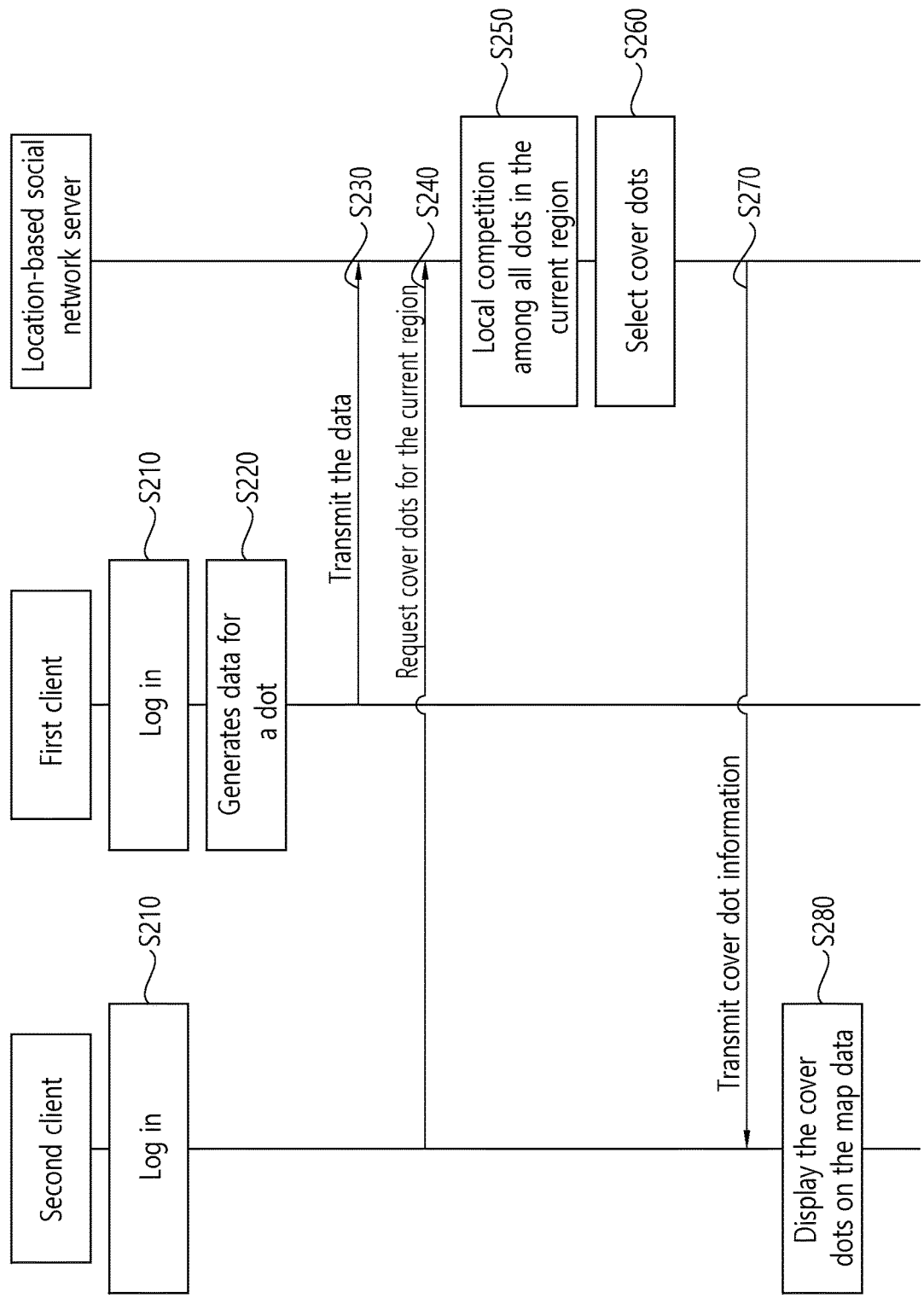
FIG. 2 is a flowchart schematically illustrating a method to effectively present a large amount of location-based content according to an embodiment of the present disclosure.

FIG. 2 is a flowchart schematically illustrating the method to effectively present a large amount of location-based content according to an embodiment of the present disclosure.

In FIG. 2, a first client and a second client log into a location-based social network provided by the server (step S210). In this case, the first client is the user of a terminal that uploads location-based content, and the second client is the user of a terminal that downloads the uploaded content.

After logging in, the first client generates data for a dot (step S220) and transmits the content data to the location-based social network server (step S230).

After logging in, the second client may request content data of a specific area that the second client desires to see (step 240). For example, if the second client changes the scope of the map to the "Ulleung Island" area, the second client requests information on dots of the current area to the location-based social network server.

In response to the request from the second client, the server extracts all dots of the current area and establish their relative importance through local competition (step S250). And then, the server selects dots of high importance as cover dots (step S260). The server transmits the information of the elected cover dots to the second client. The second client receives the information on the cover dots and displays them on the map as fixed markers (step S280).

If the scope or the current area of the map of the second client is changed, the dots included therein are also changed. The local competition among a plurality of dots within the moved area may again be executed if the user approves the update, and the cover dots will be updated accordingly.

In another example, the selection of cover dots through local competition can be performed in the second client terminal by an application provided by the server. Further, part of all operations of the server may be executed in the client terminal by the application.

Figure 3:
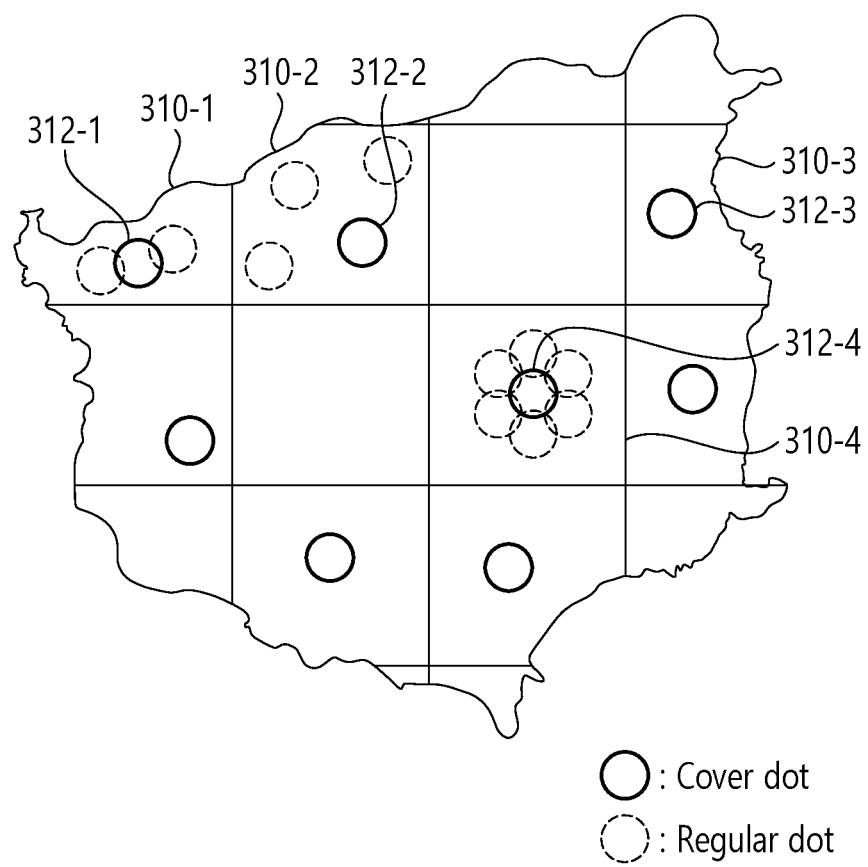
FIG. 3 is a schematic diagram describing a process of selecting cover dots through local competition.

FIG. 3 is a schematic diagram describing a process of selecting cover dots through local competition.

In FIG. 3 and also in step S250 of FIG. 2, selection of cover dots through local competition occurs among a plurality of dots within grid unit cells, and the server may select the cover dots under various competition criteria (popularity, recency, or usefulness of the content) in response to corresponding user requests.

As a basic rule, the current scope of the map is divided into a grid of unit cells, and a representative dot is selected through a local contest among all dots included in each unit cell. For example, the current area is divided into small square basic unit cells and a grid structure of these unit cells is constructed. And then, a representative is selected for each unit cell. However, herein, the unit cells are do not necessarily have to be squares. Depending on the geographic characteristics of the area, a different shape (e.g., a triangle, a rectangle, a diamond, a hexagon, a circle, etc.) may be chosen for the unit cell.

On the other hand, in the case that no dots are present in the unit cell, the unit cell remains as an area with no cover dot. In the case that a single dot is present in the unit cell, this dot is selected as the cover dot. In the embodiment shown in FIG. 3, since only one dot 312-3 is present in a unit cell 310-3, the dot 312-3 becomes the cover dot of this unit cell. However, in the case that a plurality of dots is present in the unit cell, a local contest is inevitable among the dots within the unit cell. In the embodiment shown in FIG. 3, two to seven dots are present in the unit cells 310-1, 310-2, and 310-4. Accordingly, the dots 312-1, 312-2, and 312-4 of high priorities become the cover dots.

Meanwhile, in the process of electing a cover dot among multiple dots through a local contest, several rules may be applied. Objects may be selected through various competition criteria such as (a) how new the objects are, (b) how popular the objects are, (c) how useful the objects are, or (d) whether the objects are manually approved by an editor or an editorial team. The competition criteria (a) to (c) may be applied to the uploaded date and time, the number of views, the number of likes, the number of comments, the number of saves to bucket lists, or the number of inclusions in itineraries for each dot to determine its importance. Sometimes only one of competition criteria (a) to (c) may be considered, and other times multiple criteria may be considered with varying weights. Cover dots may be updated in almost real time by carrying out the contest on a regular basis with addition of new content data.

In another example, a cover dot election scheme may additionally consider personal information of users such as names, ages, genders, educational backgrounds, preferences, and hobbies. For example, in the case of a 20-year-old user, cover dots may be selected by heavily considering (b) popularity (e.g., the number of acquired 'Likes' or the number of comments), and in the case of a 60-year-old user, cover dots may be selected through (d) the editorial process.

Figure 4:
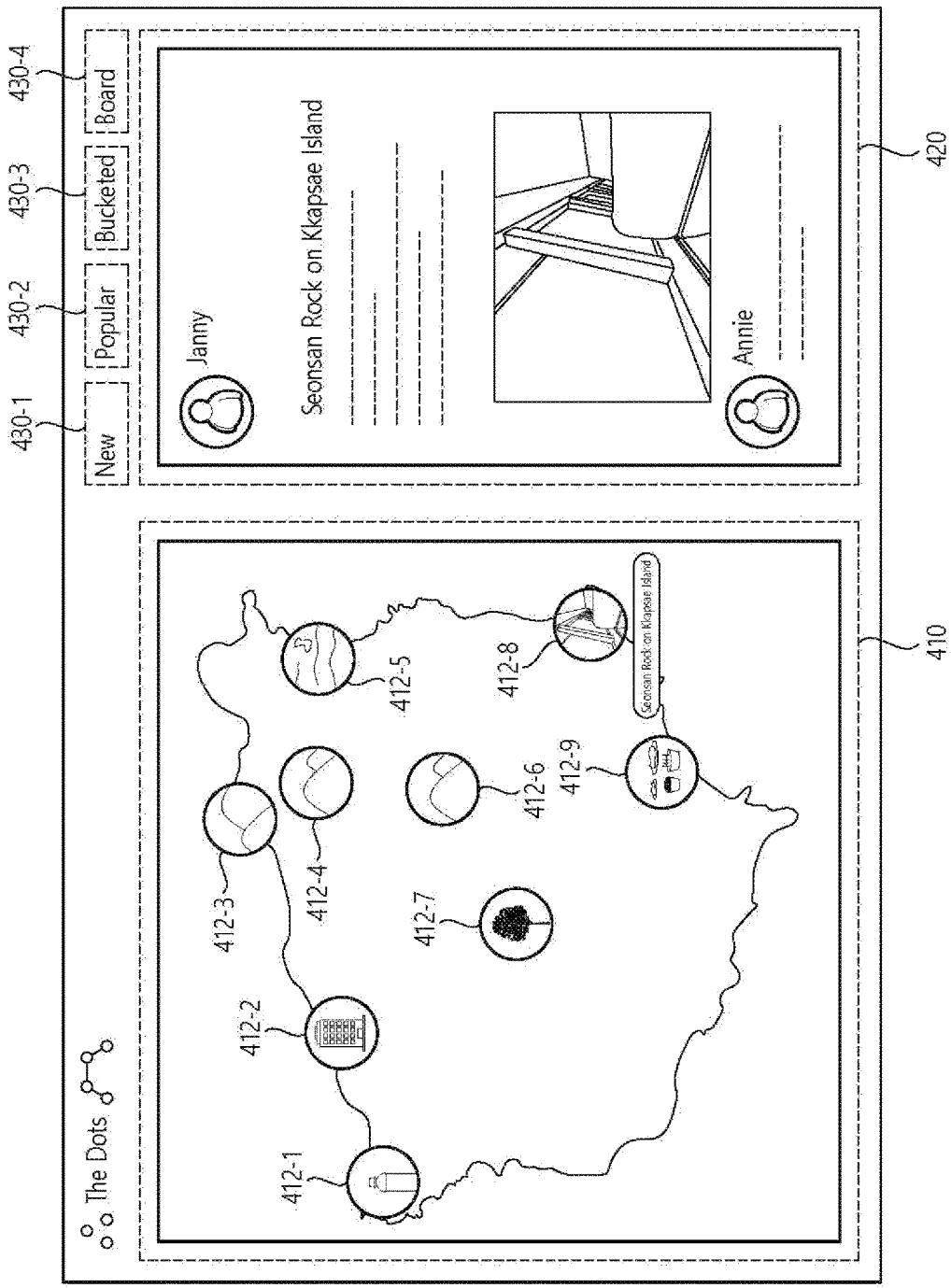
FIG. 4 is a diagram illustrating a hybrid user interface displaying a map and a social feed together.

FIG. 4 is a diagram illustrating a hybrid user interface that consists of a social feed and a map.

In FIG. 4, the user interface consists of two areas; the area 410 for displaying the map and the area 420 for displaying the social feed. In this example, both areas respond to user inputs such as drag, scroll, click actions. The area 410 and the area 420 work in an interlinked manner.

The social feed displays all location-based content included in the current area of the map in the form of a social post—a combination of images, videos, and texts. The feed is vertically scrolled. In the embodiment shown in FIG. 4, map data of an island area are displayed in the area 410, and a total of 9 cover dots 412-1 to 412-9 are displayed herein. In the area 420, the social feeds corresponding to 9 cover dots 412-1 to 412-9 are displayed. The cover dots on the map may be displayed as a marker that displays an image or a video of the relevant social content in a circular shape.

A user may click a marker related to the cover dot 412-8 within the area 410, and then, the social feed content associated with the cover dot 412-8 is automatically scrolled to the center of the feed (this is called focused) in the area 420. The reverse is also possible. In the area 420, when the social feed is scrolled to the post related to the cover dot 412-3, the related marker 412-3 may be centered and enlarged in the area 410. In this case, the title of the social feed may be displayed around the marker (e.g., a lower side). If the selected media of the post focused in the social feed is a video, the video may be rendered within the marker.

Additionally, the menu buttons 430-1 to 430-4 are placed on top of the area 420, and through this, various functions are provided. The "New" button 430-1 provides the function of arranging and displaying the content in the social feed (the area 420) in the chronological order. In this mode, the cover dots on the map (the area 410) are the collection of the newest dot in each unit cell. The "Popular" button 430-2 provides the function of arranging and displaying the content in the social feed (the area 420) in the popular order, which consider the numbers of views, likes, saves, comments and inclusions in itineraries. In this mode, the cover dots on the map (the area 410) are the collection of the most popular dot in each unit cell. In other words, the cover dots may be completely different in the "New" and "Popular" modes. The "Bucketed" button 430-3 provides the function of displaying the dots stored in the user's bucket list in the current area. This is described in detail below in FIG. 6. The "Board" button 430-4 provides the function of displaying a comment thread where comments are left, and questions are asked and answered by users.

Figure 5:
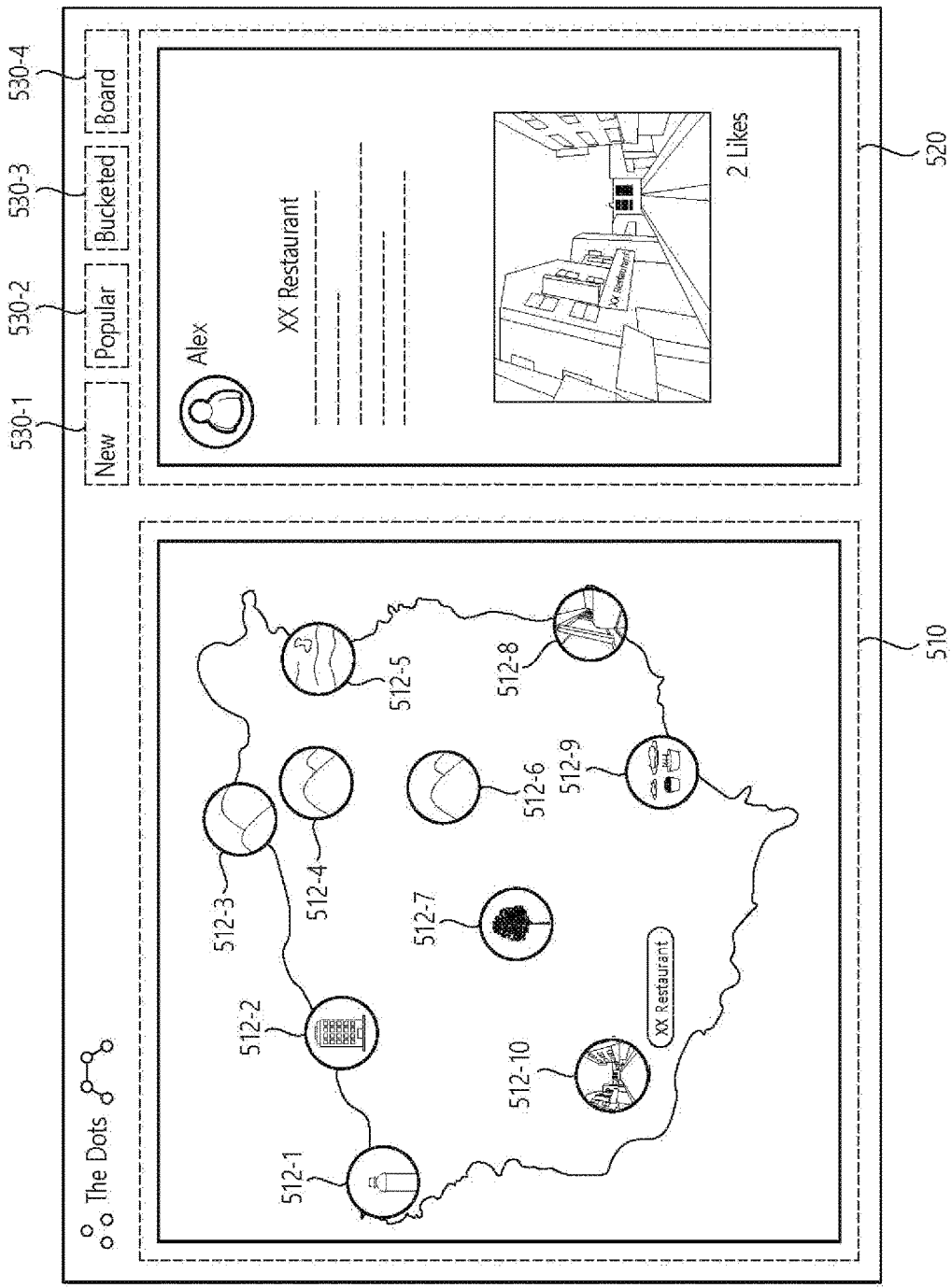
FIG. 5 is a diagram describing a process of rendering a social feed associated with regular dots.

FIG. 5 is a diagram describing a process of rendering the social feed associated with regular dots.

In FIG. 5, after all posts associated with cover dots 512-1 to 512-9 are scrolled in the social feed area 520, the status bar "End of Cover Dots" is displayed in the area 520. Further scroll now loads regular dots and the feed will display more and more until all dots in the current map area are displayed. As the scroll progresses, a temporary marker associated with the focused post in the social feed area 520 will appear in the map area 510. In the embodiment shown in FIG. 5, after all the social posts related to cover dots are scrolled in the area 520, regular dots begin to appear. The "XX restaurant", a regular dot, is focused in the social scroll feed, therefore a temporary marker 512-10 associated with the dot will appear in the area 510 at the dot's location. As the feed scrolls further and another regular dot is focused, the marker 512-10 will now disappear from the area 510 and another temporary marker associated with the newly focused dot will appear.

Using this user interface, a large amount of location-based social content can be presented in a stratified manner; a subset of the content with higher local importance will become fixed markers and the rest of the content will momentarily appear as a temporary marker on the map as the user scrolls through the social feed. Therefore, a user may enjoy all the content without missing anything through simple scrolling.

Figure 6:
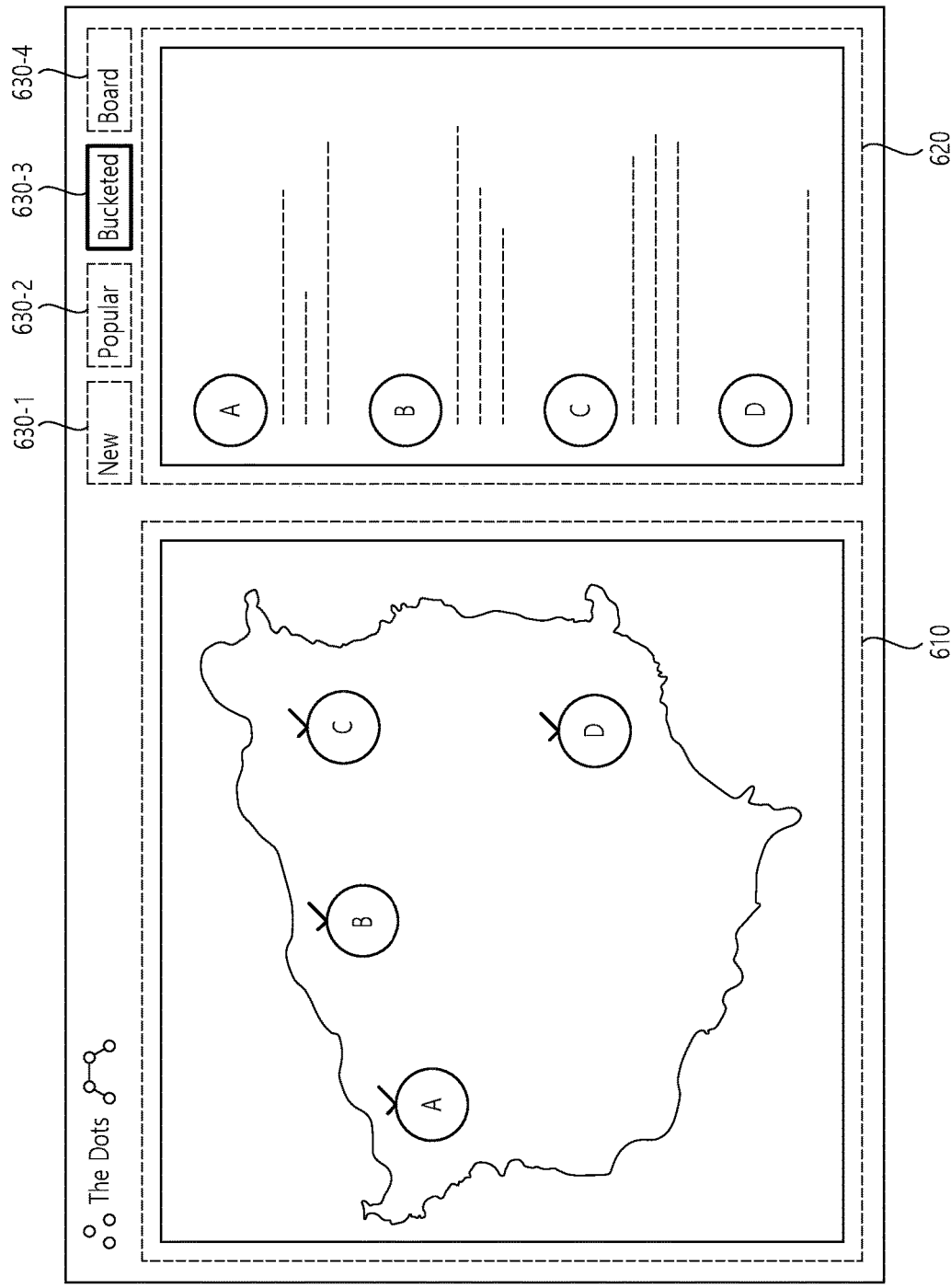
FIG. 6 is a diagram describing a process of selectively storing dots in a bucket list.

FIG. 6 is a diagram describing a process of selectively storing dots in a bucket list.

In FIG. 6, a user stores certain dots in the current area in a bucket list, and a user-specific map may be generated. For example, when the user finds the dots A, B, C, and D interesting, they can be stored in the user's bucket list with the intention of a later visit. When the "Bucketed" button 630-3 is clicked, only the dots A, B, C, and D are displayed in the map data area 610. In this case, the posts corresponding to the dots A, B, C, and D of the bucket list may be displayed in the social feed area 620.

FIG. 7 is a diagram describing dynamically changing zoom level of the map according to the distance of dots.

In a) and b) of FIG. 7, the server may dynamically change the zoom level of the map displayed on the screen of the user terminal, according to the distances between the locations of the dots that correspond to previous, current, and next posts in the social scroll feed.

In an example shown in a) of FIG. 7, a user may view posts A, B, and C in the A-B-C order in the social scroll feed area on the right side of the screen. When the user scrolls from A to B, the server may calculate the distance between the locations of dots A and B (5 km) and also the distance between the locations of dots B and C (7 km). Using these two values, the server may determine the zoom level of the map when B is focused in the social scroll feed. In the example, the zoom level corresponding to the social post B is set to 4. As the distances between dots increase, the zoom level of the map becomes smaller.

In another example shown in b) of FIG. 7, a user may view posts D, E, and F in the D-E-F order. When the user scrolls from D to E in the social feed, the server may calculate the distance between the locations of dots D and E (0.3 km) and also the distance between the locations of dots E and F (0.6 km). Using these two values, the server may determine the zoom level of the map when B is focused in the social scroll feed. In the example, the zoom level corresponding to the social post B is set to 10. Here the zoom level is bigger than that in FIG. 7 a) because the distances between dots are smaller. The proportional relationship between the average inter-dot distance and the zoom level of the map may be predetermined as a simple mathematical function.

Figure 8:
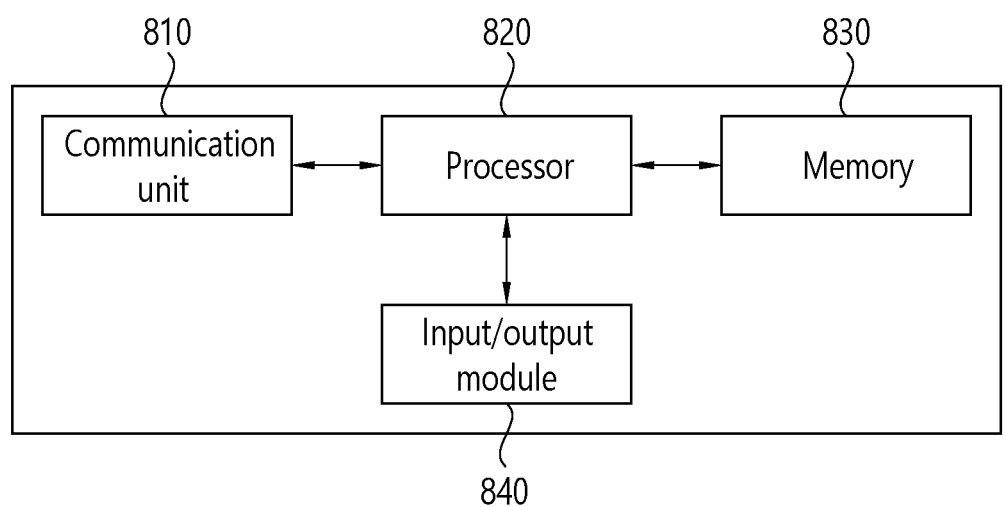
FIG. 8 is a block diagram schematically illustrating a hybrid user interface providing apparatus according to an embodiment of the present disclosure.

FIG. 8 is a block diagram schematically illustrating a hybrid user interface providing apparatus according to an embodiment of the present disclosure. As shown in FIG. 8, the apparatus (platform server apparatus) may include a communication unit 810, a processor 820, a memory, and an input/output module 840.

In FIG. 8, the communication unit 810 is an element for performing communication with an external device through a wired and/or wireless network. The communication unit 810 may include an antenna and/or a communication processor. Through this, the communication unit 810 may communicate with client terminals.

The processor 820 is an element for interlinking map data with location-based social content acquired through the communication unit 810 and controlling operations such as displaying markers, rendering social posts, selecting cover dots through local competition, and the like. The processor 820 matches uploaded social content to corresponding geographical points in the map data and stores it in the memory 830. And upon a user request for a specific area, the processor 820 elect cover dots through local competition among all dots in the corresponding area. The processor 820 returns the results to the client and performs the control operations in relation to the functions of the embodiment shown in FIG. 5 and FIG. 6.

The processor 820 is connected to the memory 830 through a signal line and performs a program stored in the memory 830.

The memory 830 stores commands associated with the programs to be performed in the processor 820 and is a storage device that stores the data (map data and location-based social content data) processed in the processor 820. This may be implemented as an external large capacity database.

The input/output module 840 includes an information input means such as a keyboard and a mouse and an information output means such as a monitor, a TV, and a touch screen.

The system or apparatus described so far may be implemented by a hardware component, a software component, and/or a combination of a hardware component and a software component. For example, the system, the apparatus, and the elements described in the embodiments may be implemented by using a processor, a controller, an arithmetic logic unit (ALU), a digital signal processor, a microcomputer, a field programmable array (FPA), a programmable logic unit (PLU), a microprocessor, or one or more general purpose computers or a special purpose computer such as a certain device which can execute an instruction or respond to the instruction. A processing unit may execute an operation system (OS) and one or more software applications performed on the OS. In addition, in response to the execution of software, the processing unit may access, store, manipulate, process, or generate data. For the convenience of understanding, it is described that only one processor is used, but it is understood to those skilled in the art that the processing unit may include a plurality of processing elements. For example, the processing unit may include a plurality of processors or a single processor and a single controller. Furthermore, other processing configurations such as a parallel processor are also possible.

Software may include a computer program, a code, an instruction, or a combination of one or more of them, and may configure a processing unit so as to operate as intended or command a processing unit independently or collectively. Software and/or data may be embodied perpetually or temporally in a certain type of machine, a component, a physical equipment, a virtual equipment, a computer storage medium or device, or a propagated signal wave to be interpreted by the processing unit or provide a command or data to the processing unit. Software may be distributed on a computer system connected through a network and stored or executed in a distributed manner. Software and data may be stored in one or more computer readable storage media.

The method according to the embodiments may be implemented in a program command form which can be executed through various computer means and stored in a computer readable storage medium. The computer readable storage medium may include a program command, a data file, a data structure, and the like individually or in combination. The program command stored in the medium may be designed and configured specifically for the embodiment or usable by being published to an ordinary skilled person in the computer software field. An example of the computer readable storage medium may include a magnetic medium such as a hard disk, a floppy disk, and a magnetic tape, an optical medium such as CD-ROM and DVD, a magneto-optical medium such as a floptical disk, and a hardware device specially configured to store and perform a program command such as ROM, RAM, and flash memory. An example of the computer program may include high level language codes executable by a computer by using an interpreter as well as machine language codes made by a compiler. The hardware device may be configured to operate as one or more software modules to perform an operation of the embodiment, and vice versa.

So far, the embodiments have been described with limited embodiments and drawings, but various modifications and alterations are possible from the description to those skilled in the art. For example, suitable results can be achieved even in the case that the described techniques are performed in a different order and/or even in the case that the components in a described system, architecture, device, or circuit are combined in a different manner and/or replaced or supplemented by other components or their equivalents.

Accordingly, other implementations, other embodiments, and equivalences with claims are within the scope of the following claims.

What is claimed is:

1. A method to effectively present a large amount of location-based content through a hybrid user interface of a map and a scroll feed in a location-based social network, the method comprising:
    acquiring location-based content; and
    presenting the location-based content using the hybrid user interface,
    wherein the hybrid user interface divides a display screen into several areas, the several areas including one area that displays the map and another area that displays the scroll feed,
    wherein the map and the scroll feed display a plurality of location-based content objects in a form of cover dots and regular dots and in a form of social media posts, respectively,
    wherein scroll actions of the scroll feed are generated in response to a user's zoom and pan actions of the map;
    wherein the map is divided into a grid of unit cells, and, for each cell of a plurality of unit cells of the grid of unit cells, a cover dot is selected through local competition among the regular dots of each respective unit cell of the plurality of unit cells;
    wherein, for each unit cell of the plurality of unit cells, cover dots are initially displayed and regular dots may be unhidden via user action on the scroll feed.

2. The method of claim 1,
    wherein the hybrid user interface takes a stratified approach to determine how the location-based content is presented, and
    wherein location-based content data is divided into a representative set consisting of cover dots and a common set consisting of regular dots.

3. The method of claim 2, wherein, in order to determine the representative set, the map is divided into a grid of unit cells, and a representative content object or a cover dot is elected for each unit cell through local competition.

4. The method of claim 3, wherein an election of the cover dots is carried out under competition criteria consisting of at least one of popularity, recency, and usefulness of the content depending on a type of a user request.

5. The method of claim 3, wherein the cover dots are selected through an editorial process in which the cover dots are manually approved by an editor or an editorial group of users.

6. The method of claim 3,
    wherein the cover dots are rendered as fixed markers on the map, and
    wherein the cover dots and the corresponding markers remain unchanged, unless the scope of the map is altered by the user and a survey of the new area is required.

7. The method of claim 3, wherein a regular dot of the common set is presented as a temporary marker which becomes visible only when associated content is focused on the scroll feed.

8. The method of claim 1, wherein a subset of location-based content of the user's liking is saved into the user's save list or bucket list creating a customized map.

9. The method of claim 1, wherein a zoom level of the map in the hybrid user interface dynamically changes in response to the scroll action of the scroll feed.

10. The method of claim 9, wherein the zoom level is determined to appropriately place and minimize overlapping of the map markers corresponding to preceding, current, and succeeding content objects in the scroll feed.

11. The method of claim 1,
    wherein each of the plurality of location-based content objects is rendered on the map as a marker that displays an image or a video in a predetermined shape having a size which reflects a relative importance of a corresponding location-based content object, and
    wherein each of the plurality of location-based content objects is rendered in the scroll feed as a social media post in a form of a combination of media and text.

12. The method of claim 1, wherein, in conjunction with the scroll actions of the scroll feed being generated in response to the user's zoom and pan actions of the map, zoom and pan actions of the map are generated in response to the user's scroll action of the scroll feed.

13. The method of claim 12, wherein the location-based content is presented when an action performed by the user in one display area of the hybrid user interface is automatically reflected in another display area of the hybrid user interface.

14. An apparatus to provide a hybrid user interface of a map and a scroll feed in a location-based social network, to effectively present a large amount of location-based content, the apparatus comprising:
    a communication processor configured to acquire location-based content from a plurality of user terminals; and
    a processor configured to present of the location-based content using the hybrid user interface,
    wherein the hybrid user interface divides a display screen into several areas, the several areas including one area that displays the map and another area that displays the scroll feed,
    wherein the map and the scroll feed display a plurality of location-based content objects in a form of cover dots and regular dots and in a form of social media posts, respectively,
    wherein scroll actions of the scroll feed are generated in response to a user's zoom and pan actions of the map;
    wherein the map is divided into a grid of unit cells, and, for each cell of a plurality of unit cells of the grid of unit cells, a cover dot is selected through local competition among the regular dots of each respective unit cell of the plurality of unit cells;
    wherein, for each unit cell of the plurality of unit cells, cover dots are initially displayed and regular dots may be unhidden via user action on the scroll feed.

15. The apparatus of claim 14,
    wherein each of the plurality of location-based content objects is rendered on the map as a marker that displays an image or a video in a predetermined shape having a size which reflects a relative importance of a corresponding location-based content object, and
    wherein each of the plurality of location-based content objects is rendered in the scroll feed as a social media post in a form of a combination of media and text.

16. The apparatus of claim 1, wherein, in conjunction with the scroll actions of the scroll feed being generated in response to the user's zoom and pan actions of the map, zoom and pan actions of the map are generated in response to the user's scroll action of the scroll feed.

17. The apparatus of claim 16, wherein the location-based content is presented when an action performed by the user in one display area of the hybrid user interface is automatically reflected in another display area of the hybrid user interface.

* * * * *